United States Patent [19]
Onoda et al.

[11] 3,867,849
[45] Feb. 25, 1975

[54] REVOLUTION MOVEMENT DRIVING APPARATUS

[75] Inventors: Toshiaki Onoda, Yokohama; Yoshimasa Ito, Kawasaki, both of Japan

[73] Assignee: Tokico Ltd., Kanagawa-ken, Japan

[22] Filed: Aug. 6, 1973

[21] Appl. No.: 386,097

[30] Foreign Application Priority Data
Aug. 9, 1972 Japan.............................. 47-79828
Aug. 11, 1972 Japan.............................. 47-79918

[52] U.S. Cl......................... 74/109, 214/1 B, 74/96
[51] Int. Cl.............................................. F16h 21/17
[58] Field of Search............. 214/1 B; 74/63, 25, 29, 74/96, 99, 89, 89.18, 109

[56] References Cited
UNITED STATES PATENTS
2,167,045   7/1939   Hooper ............................ 214/1 B
2,763,229   9/1956   Sahlin................................ 214/1 B
3,043,449   7/1962   Fliezar et al. ...................... 214/1 B
3,212,649   10/1965  Johnson et al..................... 214/1 BC
3,543,947   12/1970  Devol .............................. 214/1 BC Primary Examiner—Samuel Scott
Assistant Examiner—Wesley S. Ratliff, Jr.

[57] ABSTRACT

A revolution movement driving apparatus comprising a fixed support of a hollow cylindrical shape mounted uprightly and fixedly on a base, a rotating shaft inserted through the hollow part of the fixed support, a rod provided in parallel with the rotating shaft and adapted to rotate in unit with the rotating shaft on the outside of the fixed support, and means revolving about the fixed support for transmitting the rotating force of the rod to revolve an actuating means.

7 Claims, 4 Drawing Figures

3,867,849

3,867,849

REVOLUTION MOVEMENT DRIVING APPARATUS

BACKGROUND OF THE INVENTION

This invention relates to an apparatus for driving an actuating means in revolution movement, and more particularly to an apparatus which can drive the actuating means in revolving movement around a rotating shaft and in displacing movement in the axial direction of the rotating shaft.

Heretofore, the apparatus for driving the revolution of an actuating means has been generally of the type in which a rotating shaft supports the actuating means and moreover the rotating shaft is revolved itself to serve as an axis for the revolution of the actuating means. The supporting rotating shaft carries the weight of the actuating means and their total weight becomes very great, whereby the revolution of the supporting rotating shaft requires a driving power source of a great output. Consequently, the apparatus becomes very large in volume, the consumption power for the driving is very great and efficiency of operation is worsened.

Since the weight of the whole rotating shaft is large as described above, its inertia is accordingly great. Thus, when the actuating means is stopped in operation in a preferred position during revolution, it is very difficult to stop the actuating means exactly in the preferred position because of a large force of inertia as above described.

Also, in an apparatus, in which direction of a reaction force produced from operation of the actuating means is perpendicular to an axial direction of the rotating shaft, usually an extended line along the direction of the above reaction force may not cross the axial line of the above rotating shaft but it may be somewhat displaced therefrom, because the actuating means or the holder part of the actuating means are fixedly mounted on a side of the rotating shaft. As the result, undesired couple of forces is produced about the center of the rotating shaft by the reaction force produced at the time of operation of the actuating means, and whereby unnecessary rotating force is added to the rotating shaft and actuating means, consequent on that the position of the actuating means becomes unstable and the accurancy of positioning is deteriorated.

SUMMARY OF THE INVENTION

Therefore, a general object of the present invention is to provide a novel and useful apparatus for driving revolution which has eliminated the above disadvantage.

Another object of the invention is to provide a revolution movement driving apparatus comprising a revolution driving shaft and a rotating support shaft in separate units, in which the revolution driving shaft is revolved from a driving source of a small output for revolving the actuating means. In accordance with the present invention, as the weight and inertia of the rotating shaft are small, it is capable of displacing the actuating means precisely and rapidly to a preferred position.

Another object of the invention is to provide a revolution movement driving apparatus, in which a direction of a reaction force produced during the operation of the actuating means crosses with the axis of the rotating support shaft. According to the apparatus of the invention, undesired couple of forces may not act upon the rotating support shaft during the operation of the actuating means.

A further object of the invention is to provide a revolution movement driving apparatus which comprises a bearing device for carrying the rotating part and which can be displaced in the axial direction of the rotating shaft.

A still further object of the invention is to provide a revolution movement driving apparatus which can revolve the actuating means through an angle 360° to a preferred position of revolution.

These and other objects and features of the invention will become apparent from the following description given with reference to the accompanying drawings.

DETAILED DESCRIPTION

Figure 1:
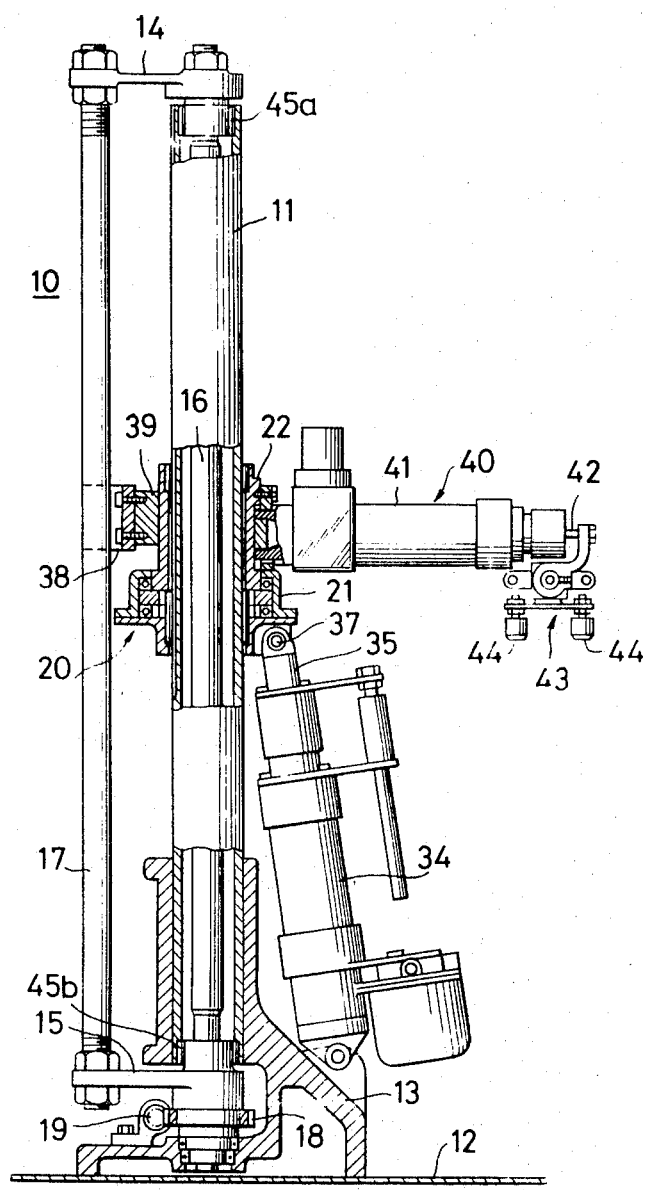
FIG. 1 is a vertical cross sectional side view of a part of an embodiment of a revolution movement driving apparatus according to the present invention.
Figure 2:
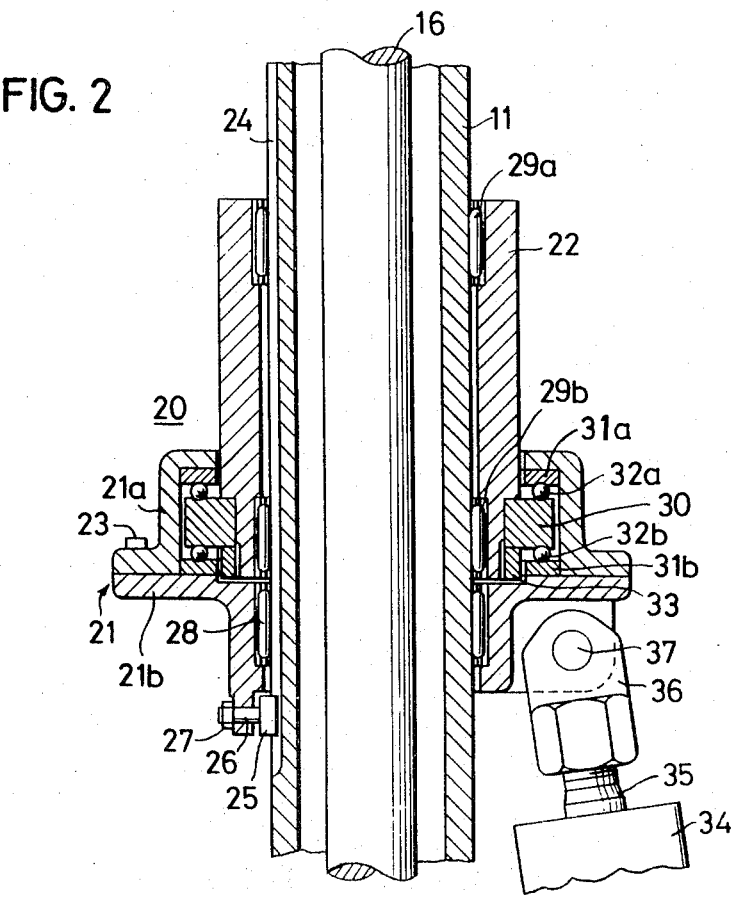
FIG. 2 is an enlarged vertical cross section of a bearing part of the revolution driving apparatus of the invention.
Figure 3:
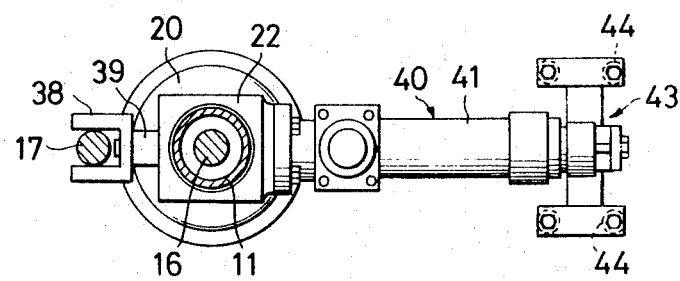
FIG. 3 is an enlarged plan view of an actuating means.

Referring now to FIGS. 1 through 3, an embodiment incorporating the revolution movement driving apparatus of the invention as applied to an industrial robot is described. In FIG. 1 is shown an industrial robot 10, which can perform the operation of conveying and mounting predetermined numbers of articles successively supplied from specified positions of supplying articles to the shelves of progressively varying heights.

A hollow stationary column or support 11 is fixedly held by a support 13 in an upright position on a floor surface 12 with its lower end spaced from the floor surface 12. The stationary support 11 is inserted with a rotating shaft 16 having bases of arms 14 and 15 fixed respectively at the upper and lower ends and rotatably carried by radial bearing 45a and 45b. The arms 14 and 15 are fixed to a rod 17 located in parallel with the stationary support 11. A pinion 18 on the base of the arm 15 is rotated by a rack 19 which is slidably moved from a driving source (not shown) such as from a drive cylinder.

Approximately in the middle of the stationary support 11 is fitted with a bearing device 20 which is slidably movable upwardly and downwardly with respect to the support 11. As shown in an enlarged scale in FIG. 2, the bearing device 20 generally includes a slide bearing 21 and a rotating bearing 22 of a cylindrical shape. The slide bearing 21 consists of half portions 21a and 21b connected with a bolt 23. In the lower part of the lower half 21b of the slide bearing, a key 25 is fixed by bolt 26 and nut 27, which key engages with a key way 24 provided in axial direction on the periphery of the stationary support 11. The slide bearing 21 thus during its upward and downward sliding movement is guided by the key 25 and key way 24 and moves upwardly and downwardly without making rotation. Between the lower half 21b and the support 11 is provided a bearing 28 which enables free upward and downward sliding movement.

Between the rotary bearing 22 and the stationary support 11 is provided bearings 29a and 29b which allow upward and downward sliding movement and rotation of the rotating shaft. In the rotary bearing 22 is fittedly provided a thrust bearing central wheel 30 in the upper half 21a of the slide bearing and it is fixed with a supporting ring 35 from the lower side. Thrust bearing plates 31a and 31b are provided in the slide bearing 21 in opposite to the central wheel 30. Between the central wheel 30 and the thrust bearing plates 31a and 31b are also provided balls 32a and 32b. A small clearance is formed between the lower end of the rotary bearing 22 and the upper surface of the half portion of the slide bearing 21b.

Thus, the rotary bearing 22 can slidably move upwardly and downwardly with respect to the stationary support 11 together with the bearing 21 and can revolve relative to the slide bearing 21 and the stationary support 11.

A two-stage drive cylinder 34 for upward and downward driving operation has a lower end pivotally connected to a support 13. At an end of a piston rod 35 of the cylinder 34 is attached a pusher 36, which is pivotally connected to the lower half 21b of the slide bearing with a pin 37.

In the above rotary bearing 22, there is provided an arm 39 which has a guide 38 of a channel form in cross section. The guide 38 is, in its channel, engaged with the rod 17 and is slidably movable upwardly and downwardly. A two-stage drive cylinder 41 forming an actuating means 40 is fixed to the rotary bearing 22 on the side thereof opposite to an arm 39 in its diametrical direction. A grasping means 43 is provided at the forward end of the piston rod 42 of the drive cylinder 41.

Operation of the apparatus according to the above construction is now illustrated.

First, during the revolving operation of the actuating means 40, the rack 19 may slidably move by actuation of the driving source as above described and the pinion 18 is rotated. The rotating shaft 16 and arms 14 and 15 rotate unitarily with the pinion 18, whereby the rod 17 revolves about the fixed support 11. By rotation of the rod 17, the rotary bearing 22 can receive a rotating force through the guide 38 and arm 39 and rotates about the fixed support 11. Therefore, the actuating means 40 comprising the two-state drive cylinder 41 and the grasping means 43 can revolve about the stationary support 11 unitarily with the rotary bearing 22. Accordingly as the rack 19 reciprocates, the pinion 18, rotating shaft 16, arms 14, 15, rod 17, guide 38, arm 39, rotary bearing 22, and actuating means 40 unitarily swing about the central axis of the shaft 16 or the fixed support 11. The fixed support 11 supports the guide 38, arm 39, and actuating means 40 by means of the bearing device 20. The weights of the bearing device 20, guide 38, arm 39 and actuating means 40 are carried by the stationary support 11.

The weight of the actuating means 40 is carried for support by the thrust bearing of the slide bearing 21 and the cylinder 34. The stationary support 11 has the construction which cannot rotate but merely can guide the revolution of the actuating means 40. Therefore, a large torque is not necessary for revolving the actuating means 40 but a drive source of a small output may suffice. Since the inertia of the rotating part is small, the actuating means 40 can make a stop operation exactly at a predetermined position when the revolution is topped.

During the upward and downward operation of the actuating means 40, the drive cylinder 34 operates with its piston rod 35 extending or contracting. By this operation, the bearing device 20 are guided in the bearings 29a, 29b, and 28 to move along the periphery of the fixed support 11 in the axial direction.

The rotary bearing 22 can slidably move upwardly and downwardly relative to the stationary support 11 and rotate with respect to the slide bearing 21, so that, when the rotating shaft 16 is rotated as described above, the actuating means 40 is revolved through the movement of the rod 17 and can slidably move upwardly and downwardly together with the bearing device 20.

After the above revolving and upward and downward movements either singly or in combination, the drive cylinder 41 of the actuating means 40 can operate and the piston rod 42 may extend or contract, so that the grasping device or fingers 43 is displaced either in left or right directions on the figure and may reach a predetermined position. At this time, the cylinder of the grasping means 43 will operate to move closer to or away from each other so as to grasp the transferred articles or release the grasping thereof.

During the operation of the drive cylinder 41 at this time, the extended line of the reaction force produced in the direction inverse to the operating direction of the piston rod 42 may cross the center of the rotating shaft 16. Then, couple of forces is not acted upon the rotating shaft 16 by reaction force. Even though the drive cylinder 41 is operating, undesired force is not applied to the rotating shaft 16.

Therefore, a complicated automatic operation is possible through the above revolving, upward and downward or left to right displacing operations, these operations being adequately in combination, in such a manner that the articles for example placed in the supply position at the predetermined level of height can be conveyed and mounted onto each shelf of the transferring shelves of progressively varying heights.

Further, in the above embodiments, the key 25 and the key way 24 are not necessarily required, which may be omitted as desired.

Figure 4:
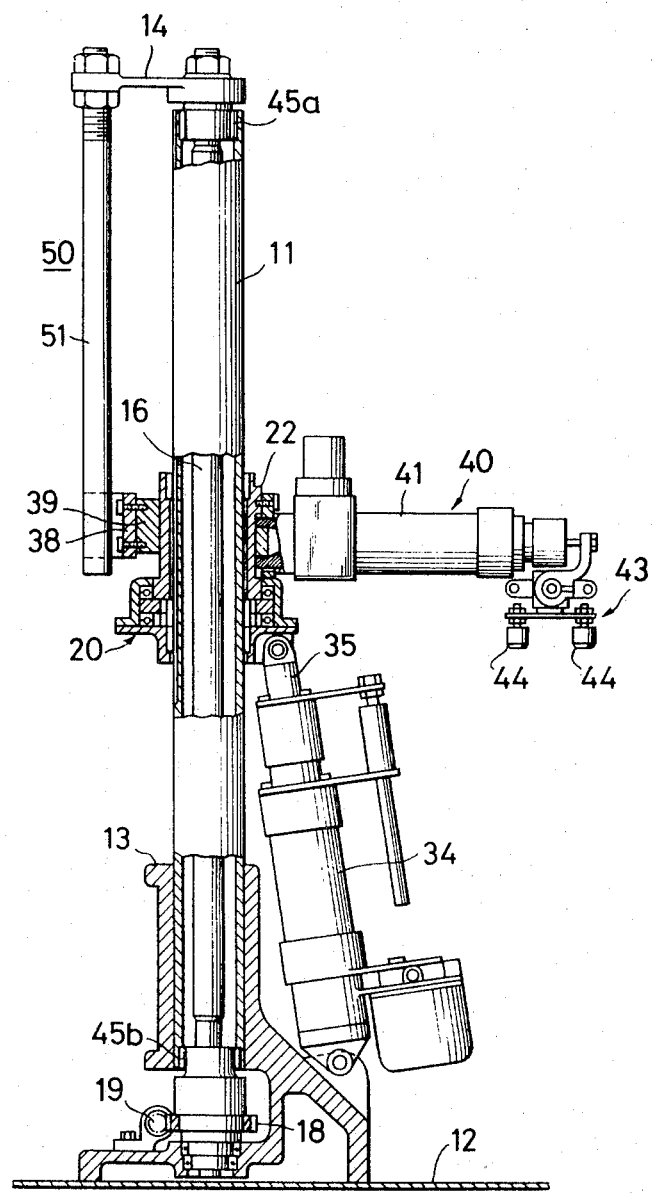
FIG. 4 is a vertical cross sectional side view of a part of another embodiment of the revolution movement driving apparatus according to the invention.

FIG. 4 shows a partly cutaway vertical cross section of a second embodiment of the revolution movement driving apparatus according to the invention. In FIG. 4, identical numerals are used for the identical parts in FIG. 1 and the detailed description thereof is omitted.

The difference of a revolution movement driving apparatus 50 of this embodiment between the revolution movement driving apparatus 10 of the preceding embodiment reside in whether a rod 51 is used in place of the rod 17 extending between the arms 14 and 15 and fixed thereto in the apparatus 10.

The rod 51 has its upper end fixed to the arm 14 and its lower end extends to the position where the guide 38 still engages with the rod 51 even when at least the actuating means 40 is in the lowest position. However, the rod 51 has not a portion extending further therebelow. Therefore, preferably the rod 51 may be provided so high as approximately half the height of the rod 10. Thus, the rod 51 which has no arm 15 as in the above-mentioned embodiment is transmitted a rotating force merely through the arm 14 during the rotation of the arm 16.

The lower end of the rod 51 is not reached to the level of height of the drive cylinder 34 so that during its rotation the rod 51 is not obstructed of its rotation by the cylinder 34. Accordingly, the rod 51 and the actuating means 40 can rotate freely without being obstructed by the cylinder 34 in a preferred range of angle less than 360° and more than 360°.

There is no rotating body around the support 13. The cover (not shown) hanging over the support is not required to have an opening for the rotating body (rod) but can sufficiently enclose the portions including the support 13, rack 19, and pinion 18.

Further, this invention is not limited to these embodiments but various variations and modifications may be made without departing from the scope and spirit of the invention.

What we claim is:

1. A revolution movement driving apparatus comprising:
    a stationary support of a hollow shape uprightly fixed on a base;
    a rotating shaft inserted through the hollow part of said fixed support;
    drive means for rotating said rotating shaft;
    a rod provided in parallel with said rotating shaft on the outside of said stationary support and revolvable unitarily with said rotating shaft;
    means for transmitting a revolving force by revolving about said stationary support with said rod, said means being engaged to said rod in the direction of the rotation of the rod;
    a revolving part which is unitarily revolved with said revolving force transmitting means; and
    a bearing device for supporting said revolving force transmitting means and said revolving part revolvably about the stationary support,
    the load for said bearing device being carried by the stationary support.

2. A revolution movement driving apparatus as defined in claim 1, in which said rod is adapted to unitarily revolve with said rotating shaft through arms respectively extending from upper and lower ends of said rotating shaft.

3. A revolution movement driving apparatus as defined in claim 1, in which said rod is adapted to unitarily rotate with said rotating shaft through an arm extending from the upper end of said rotating shaft.

4. A revolution movement driving apparatus as defined in claim 1, in which said rotating force transmitting means comprises means engageable with said rod in the direction of rotation of the rod and rotating means rotatably provided about said stationary support with said engageable means and revolving part fixed thereto.

5. A revolution movement driving apparatus as defined in claim 1, in which said revolving part is an actuating means capable of operating in a direction perpendicular to the axial direction of said rotating shaft, and said actuating means is fixed at said rotating force transmitting means such that a central line of operation producing said reaction force crosses an axis of said rotating shaft.

6. A revolution movement driving apparatus as defined in claim 1, in which said bearing device comprises a slide bearing slidably movable upwardly and downwardly along a periphery of said stationary support in the axial direction and a rotary bearing slidably movable upwardly and downwardly unitarily with said slide bearing and rotatable about said stationary support unitarily with said rotating force transmitting means.

7. A revolution movement driving apparatus as defined in claim 6, which further comprises an upward and downward drive source for upwardly and downwardly moving said bearing device along said stationary support.

* * * * *